(12) United States Patent
Endo et al.

(10) Patent No.: US 12,241,548 B2
(45) Date of Patent: Mar. 4, 2025

(54) OBSTACLE DETECTOR OF CONSTRUCTION VEHICLE

(71) Applicant: SAKAI HEAVY INDUSTRIES, LTD., Tokyo (JP)

(72) Inventors: Ryohei Endo, Saitama (JP); Norio Morioka, Saitama (JP); Masato Ohgiya, Saitama (JP); Nobumasa Motokawa, Saitama (JP)

(73) Assignee: Sakai Heavy Industries, Ltd., Tokyo (JP)

( * ) Notice: Subject to any disclaimer, the term of this patent is extended or adjusted under 35 U.S.C. 154(b) by 821 days.

(21) Appl. No.: 17/364,827

(22) Filed: Jun. 30, 2021

(65) Prior Publication Data

US 2021/0404553 A1    Dec. 30, 2021

(30) Foreign Application Priority Data

Jun. 30, 2020   (JP) ................................. 2020-112360

(51) Int. Cl.
*F16H 61/433*  (2010.01)
*B60T 7/22*    (2006.01)
(Continued)

(52) U.S. Cl.
CPC .............. *F16H 61/433* (2013.01); *B60T 7/22* (2013.01); *E01C 19/26* (2013.01); *F15B 15/24* (2013.01)

(58) Field of Classification Search
CPC .... F16H 61/433; F16H 61/431; F16H 61/439; B60T 7/22; B60T 2201/022; E01C 19/26;
(Continued)

(56) References Cited

U.S. PATENT DOCUMENTS

2001/0049318 A1* 12/2001 Nagura ............... F16H 61/4157
60/489

FOREIGN PATENT DOCUMENTS

CN         208563053 U   *  3/2019
JP         2001349426 A     12/2001
(Continued)

OTHER PUBLICATIONS

Notice of Reasons for Refusal in Japanese Application No. 2020-112360 (Apr. 28, 2022).

*Primary Examiner* — Peter D Nolan
*Assistant Examiner* — Demetra R Smith-Stewart
(74) *Attorney, Agent, or Firm* — CRGO Global; Steven M. Greenberg (57) ABSTRACT

An obstacle detector of a construction vehicle includes a brake mechanism which includes: a first hydraulic closed circuit including a pump for rolling, which is equipped with a swash plate, and a motor for rolling, which is connected with the pump for rolling; a second hydraulic closed circuit including a first hydraulic passage communicating with one side of the pump for rolling and a second hydraulic passage communicating with another side of the pump for rolling, to actuate the swash plate; and a neutral valve provided in the second closed circuit. When an emergency brake is activated, at least one of a compressive returning force to compress a low-pressure side of the tilted swash plate for returning the swash plate to a neutral position and a decompressive returning force to decompress a high-pressure side of the swash plate for returning the swash plate to the neutral position is generated.

6 Claims, 7 Drawing Sheets

(51) Int. Cl.
*E01C 19/26* (2006.01)
*F15B 15/24* (2006.01)

(58) Field of Classification Search
CPC ............... F15B 15/24; B60W 2300/15; B60Y 2200/413
See application file for complete search history.

(56) References Cited

FOREIGN PATENT DOCUMENTS

| | | | |
|---|---|---|---|
| JP | 2005256478 A | * | 9/2005 |
| JP | 2019012394 A | | 1/2019 |

* cited by examiner

OBSTACLE DETECTOR OF CONSTRUCTION VEHICLE

CROSS REFERENCE TO RELATED APPLICATIONS

The present application claims the benefit of priority to Japanese Patent Application No. 2020-112360 filed on Jun. 30, 2020, the disclosures of all of which are hereby incorporated by reference in their entireties.

BACKGROUND OF THE INVENTION

Field of the Invention

The present disclosure relates to an obstacle detector of a construction vehicle.

Description of the Related Art

There is an obstacle detector for detecting obstacles present around a construction vehicle such as a compactor shown in Japanese Patent Application Publication No. 2019-12394. The obstacle detector disclosed in Japanese Patent Application Publication No. 2019-12394 includes a controller provided with a determinator for determining presence or absence of an obstacle based on data from a sensor, and a brake mechanism causing the construction vehicle to activate an emergency brake after the determinator has detected the obstacle.

The brake mechanism includes a first closed circuit, a second closed circuit, and a neutral valve provided in the second closed circuit. The first closed circuit is configured to have a structure in which a pump for rolling provided with a swash plate and driven by an engine is connected in series to a motor for rolling which causes the construction vehicle to roll. The second closed circuit includes a first hydraulic passage communicating with one side of the pump for rolling and a second hydraulic passage communicating with the other side of the pump for rolling, to actuate the swash plate.

When the emergency brake is activated, the swash plate of the pump for rolling is rapidly returned to a neutral position by switching the neutral valve to decelerate and stop the construction vehicle. However, the pump for rolling, the motor for rolling, and a hydraulic circuit may have poor response, due to specifications thereof, to have the swash plate of the pump for rolling returned slowly to the neutral position. In this case, the swash plate returning slowly becomes a barrier to obtain a rapid braking force, resulting in the construction vehicle rolling a long distance until stopped. Accordingly, there is a risk that the construction vehicle hits the obstacle.

The present disclosure is intended to provide an obstacle detector of a construction vehicle capable of generating a braking force required for an emergency brake

BRIEF SUMMARY OF THE INVENTION

An obstacle detector of a construction vehicle includes: a controller including a determinator for determining presence or absence of an obstacle based on data from a sensor; and a brake mechanism for causing the construction vehicle to activate an emergency brake after the determinator has detected the obstacle, wherein the brake mechanism includes: a first hydraulic closed circuit in which a pump for rolling, which is equipped with a swash plate and is driven by an engine, is connected in series to a motor for rolling, which causes the construction vehicle to roll; a second hydraulic closed circuit including a first hydraulic passage communicating with one side of the pump for rolling and a second hydraulic passage communicating with another side of the pump for rolling, to actuate the swash plate; and a neutral valve provided in the second closed circuit and arranged in parallel with the pump for rolling, wherein, when the emergency brake is activated, at least one of a compressive returning force to compress a low-pressure side of the tilted swash plate for returning the swash plate to a neutral position and a decompressive returning force to decompress a high-pressure side of the swash plate for returning the swash plate to the neutral position is generated.

With the structure, a returning force of the swash plate is assisted so that a braking force required for an emergency brake is generated.

Further, the neutral valve is preferably controlled to communicate after at least one of the compressive returning force and decompressive returning force has been generated.

Still further, the neutral valve is preferably controlled to communicate at the same time as at least one of the compressive returning force and decompressive returning force is generated.

With the structure, the returning force of the swash plate is more accurately assisted.

Further, a compression-side switching valve is preferably switched to supply hydraulic oil to the low-pressure side of the swash plate so as to generate the compressive returning force, and a decompression-side switching valve is preferably switched to return the hydraulic oil in the high-pressure side of the swash plate to a hydraulic tank so as to generate the decompressive returning force.

With the structure, the returning force of the swash plate is assisted with a simple structure.

Further, switching timing of the neutral valve, the compression-side switching valve, and the decompression-side switching valve is preferably set based on at least one of time for generating the compressive returning force, time for generating the decompressive returning force, vehicle speed of the construction vehicle, a swash plate angle of the swash plate, the number of rotations of the engine, and a position of a forward/reverse lever.

With the structure, the swash plate is prevented from swinging back caused by the inertial force of the swash plate, to stabilize behavior of the construction vehicle.

The present disclosure provides an obstacle detector of a construction vehicle capable of generating a braking force required for an emergency brake Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1A is a plan view.

FIG. 8B is the same when the construction vehicle rolls at low speed, and FIG. 8C is the same when the construction vehicle rolls at extremely low speed

DETAILED DESCRIPTION OF THE INVENTION

Hereinafter, a description is given of an embodiment (present embodiment) of the present disclosure. Note that the present disclosure is not limited to the following description and drawings, and may be modified for execution as appropriate within a range where advantageous effects of the present disclosure are not significantly degraded. In the following description, the same components are denoted by the same symbols in different embodiments, and duplicate descriptions thereof are omitted. Further, the same terms are used for components having the same functions, and duplicate descriptions of such components are omitted.

Figure 1A:
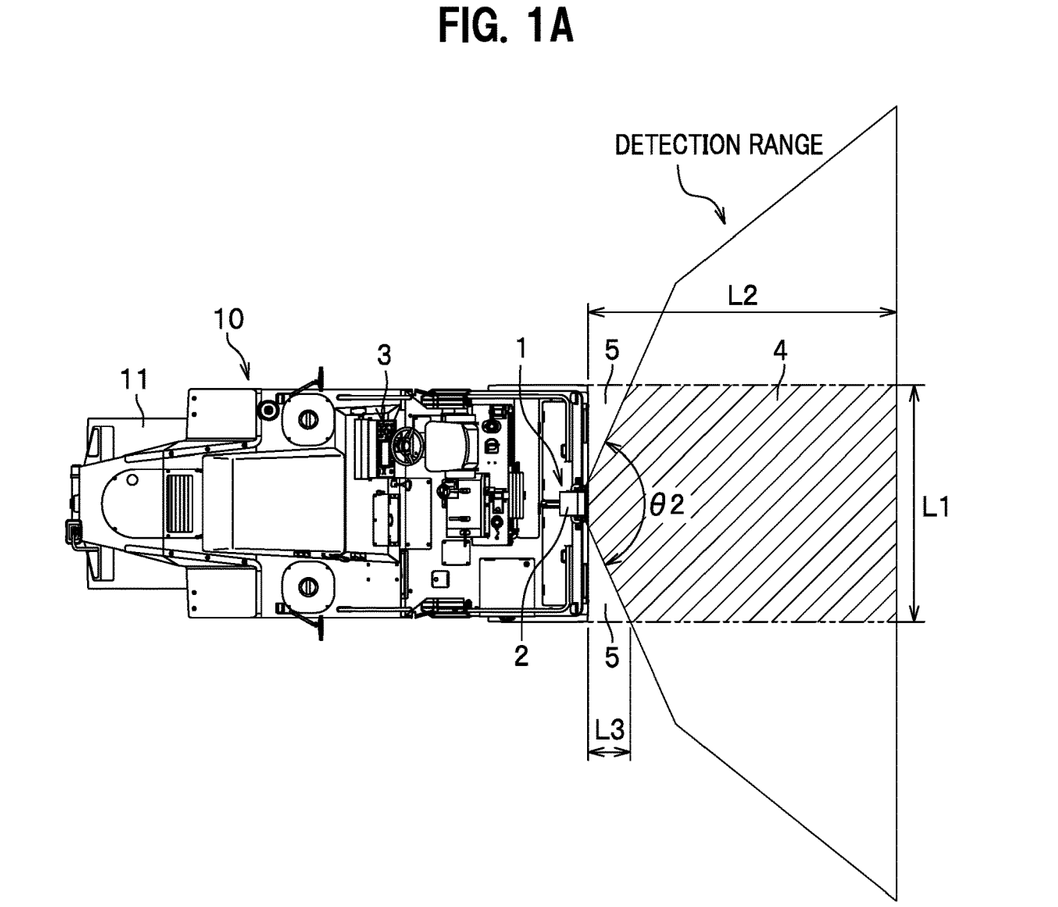
Figure 1B:
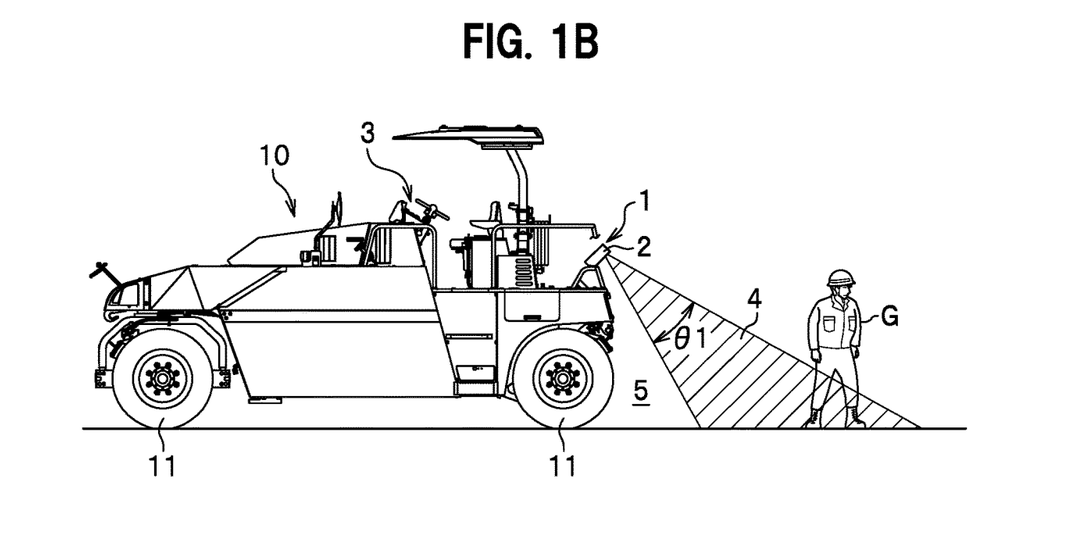
FIG. 1B is a side view, of a construction vehicle provided with an obstacle detector according to an embodiment of the present disclosure.

As illustrated in FIG. 1, an obstacle detector 1 of a construction vehicle (simply referred to as an "obstacle detector" hereinbelow) of the present disclosure is provided on a construction vehicle such as a compactor to perform a work while rolling at low speed. FIG. 1 illustrates a tire roller 10 for compacting an asphalt road or the like by tires 11, provided with the obstacle detector 1. The tire roller 10 is merely an example, and the obstacle detector 1 may be provided on any other construction vehicle.

Figure 2:
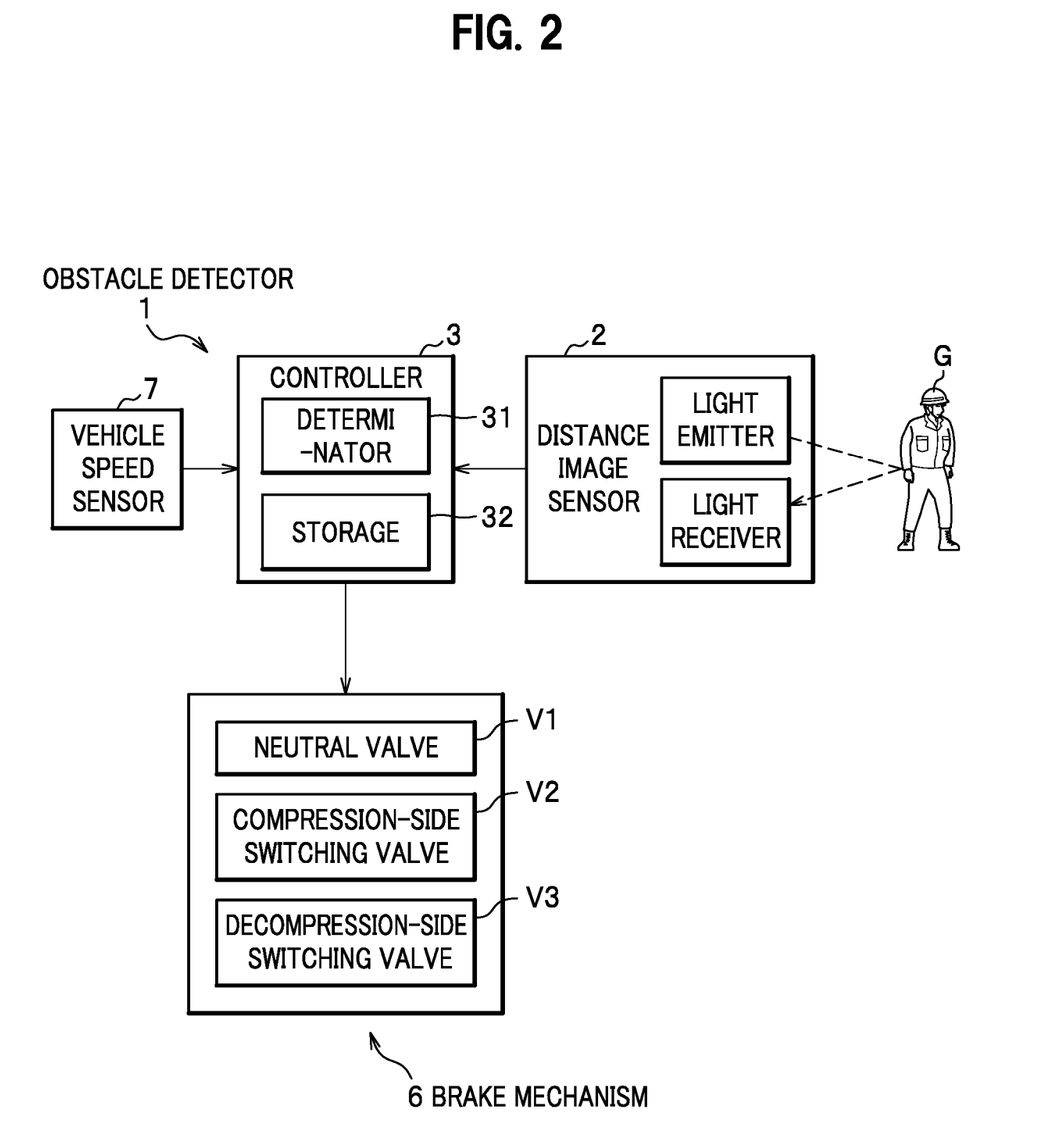
FIG. 2 is a block diagram of the obstacle detector according to the present embodiment.

In FIG. 2, the obstacle detector 1 includes a distance image sensor (3D distance sensor) 2 of a TOF (Time Of Flight) type for measuring a distance based on a time difference between projected light and reflected light, and a controller 3 for determining presence or absence of an obstacle G based on measurement data sent from the distance image sensor 2.

The distance image sensor 2 includes a light emitter for emitting the projected light such as infrared light and a light receiver for receiving the reflected light reflected when the projected light has irradiated an object. A distance to the object is measured by measuring time since the light emitter has emitted the infrared light until the light receiver receives the reflected light. A projection angle from the distance image sensor 2 is 95 degrees in the lateral direction and 32 degrees in the longitudinal direction (symbol θ1 shown in FIG. 1B), for example, to have a projection cross section in a horizontally-long rectangular shape. An image resolution is 1024 pixels in total, having 64 pixels in the lateral direction and 16 pixels in the longitudinal direction. The distance image sensor 2 is attached to the center in a width direction at the rear of the tire roller 10 so as to project the projected light obliquely downward in a reverse rolling direction.

Regarding a detection range for the obstacle G, if a projected range of the projected light is used as a detection range as it is, that is, if a dimension L1 in the width direction is set to be longer than a width dimension of the tire roller 10, it may be determined that the obstacle G is present even though there is no risk of collision, causing the vehicle to stop unnecessarily. Therefore, the dimension L1 in the width direction of a detection range 4 (shown by slash lines in FIG. 1) is preferably set to be approximately the same as the width dimension of the tire roller 10. The distance image sensor 2 measures a distance to the obstacle G so that a determinator 31 (see FIG. 2) of the controller 3 determines whether or not the obstacle G is present in the detection range 4 set to have the width dimension, based on measurement data for every pixel, specifically, the distance between the distance image sensor 2 and the obstacle G in the width direction. With the use of the distance image sensor 2 as described above, the dimension L1 of the detection range 4 is kept constant in the longitudinal direction of the vehicle. That is, the detection range 4 is easily set to have a substantially rectangular shape having one side of the dimension L1, in a plan view as in FIG. 1A. A dimension L2, in the longitudinal direction of the vehicle, of the detection range 4 is appropriately set based on generally used rolling speed, and is set to about 3 meters in the present embodiment, for example.

Further, the projected light of the distance image sensor 2 is projected obliquely downward in the reverse rolling direction so that a lateral angle θ2 of the projected light in a planar view covers a larger range than 95 degrees. Therefore, a distance L3 in the longitudinal direction of non-detection ranges 5, defined between both ends of the rear of the tire roller 10 and the detection range 4, is short. That is, blind areas not to be detected, which are defined on both sides of the rear of the vehicle, are reduced in size.

The controller 3 includes a brake mechanism 6 which brakes the vehicle when it is determined that the obstacle G is present in the detection range 4. The controller 3 is arranged in an operation panel at a driver seat, for example.

Figure 3:
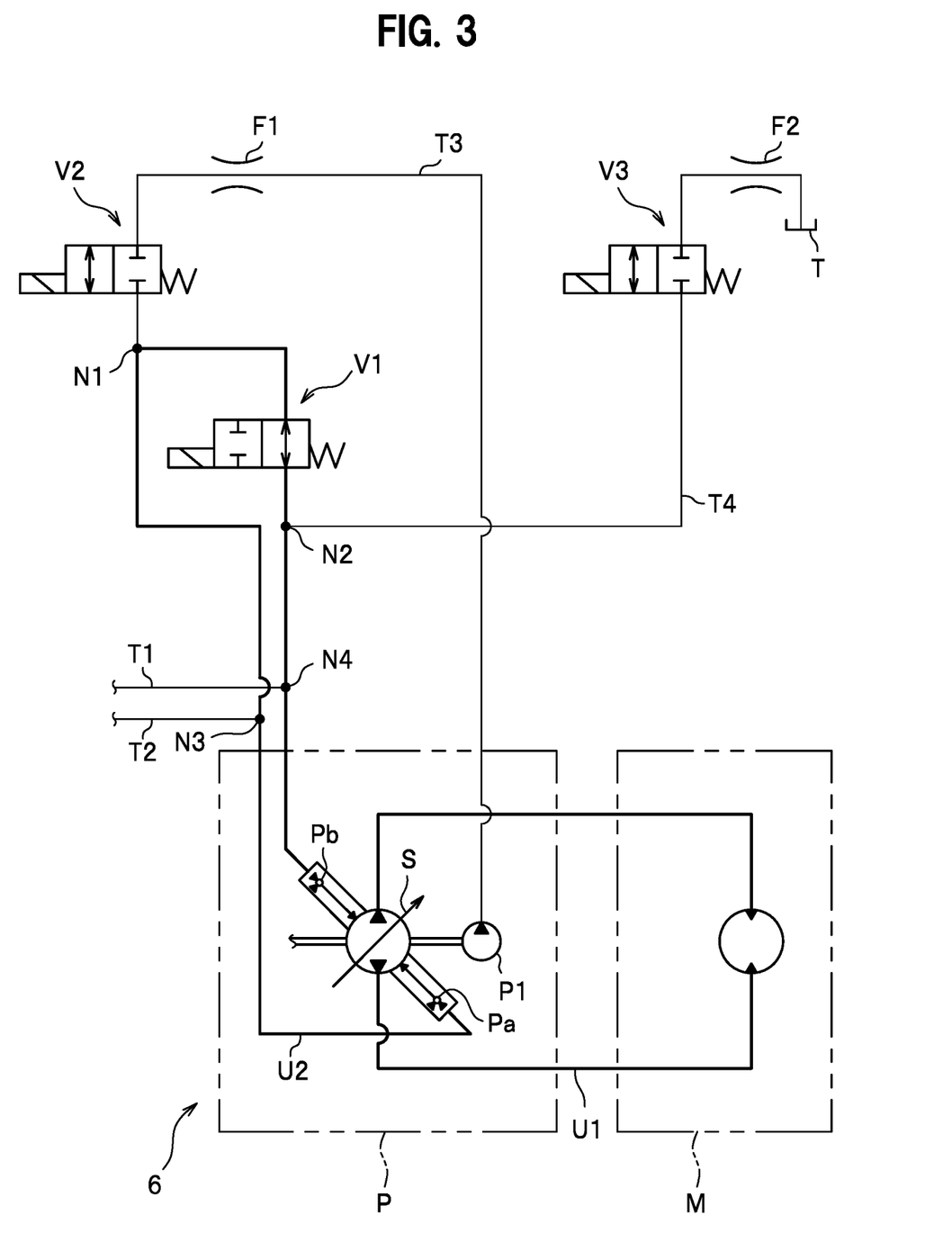
FIG. 3 is a schematic diagram of a hydraulic circuit according to the present embodiment.

A description is given of an example of the brake mechanism 6. In FIG. 3, a pump for rolling P driven by an engine (not shown) is connected in series to a motor for rolling M to rotate the tires 11 (FIG. 1), to form a first hydraulic closed circuit U1. The pump for rolling P is a swash plate pump having a swash plate. Further, the pump for rolling P includes a charge pump P1.

The pump for rolling P is connected to a first hydraulic passage T1 and a second hydraulic passage T2 for actuating the swash plate S, to form a second hydraulic closed circuit U2. The second hydraulic closed circuit U2 is provided with a two-position two-port neutral valve (solenoid valve) V1 in parallel with the pump for rolling P.

Further, a bypass hydraulic passage T3, connecting the charge pump P1 to an intermediate point N1 on the second hydraulic closed circuit U2, is provided with a two-position two-port compression-side switching valve (solenoid valve) V2. Assuming that a point where the second hydraulic passage T2 is connected to the second hydraulic closed circuit U2 is an intermediate point N3, the intermediate point N1 is provided between the intermediate point N3 and the neutral valve V1. The bypass hydraulic passage T3 is provided with a first orifice F1 at a point closer to the charge pump P1 with respect to the compression-side switching valve V2.

Further, a return hydraulic passage T4, connecting a hydraulic tank T to an intermediate point N2 on the second hydraulic closed circuit U2, is provided with a two-position two-port decompression-side switching valve (solenoid valve) V3. Assuming that a point where the first hydraulic passage T1 is connected to the second hydraulic closed circuit U2 is an intermediate point N4, the intermediate point N2 is provided between the intermediate point N4 and the neutral valve V1. The return hydraulic passage T4 is provided with a second orifice F2 at a point closer to the hydraulic tank T with respect to the decompression-side switching valve V3.

As illustrated in FIG. 2, the controller 3 includes a storage 32 to store a data file defining timing for switching the neutral valve V1, the compression-side switching valve V2, and the decompression-side switching valve V3, and the like.

When the engine is running, the neutral valve V1 is in the left position in FIG. 3 so that the first hydraulic passage T1 does not communicate with the second hydraulic passage T2. Therefore, when a forward/reverse lever provided near the driver seat is tilted to a forward position while the engine is running, pressure in the second hydraulic passage T2 becomes higher, to tilt the swash plate S to one side. Accordingly, pressure oil flows toward one direction in the first hydraulic closed circuit U1, and the motor for rolling M rotates in one direction to roll the vehicle forward. When the forward/reverse lever is tilted to a reverse position, pressure in the first hydraulic passage T1 becomes higher, to tilt the swash plate S to the other side. Accordingly, the pressure oil flows toward the other direction in the first hydraulic closed circuit U1, and the motor for rolling M rotates in the other direction to roll the vehicle rearward.

When the engine is not running, the neutral valve V1 is in the right position as illustrated in FIG. 3 so that the first hydraulic passage T1 communicates with the second hydraulic passage T2. Accordingly, there is no pressure difference between the first hydraulic passage T1 and the second hydraulic passage T2, to locate the swash plate S in the neutral position. Thus, HST (Hydro Static Transmission) brake is activated in the first hydraulic closed circuit U1.

Here, in a conventional brake mechanism, when an obstacle is detected while a vehicle is rolling rearward, the controller 3 outputs a brake signal to switch the neutral valve V1 from the left position to the right position. Accordingly, even when the engine is running and the forward/reverse lever remains tilted on the reverse position, the swash plate S is positioned at the neutral position to activate HST brake in the first hydraulic closed circuit U1, so that the motor for rolling M is stopped.

However, the conventional structure may poorly respond, even if the neutral valve V1 is controlled to communicate for the swash plate S of the pump for rolling P, to have the swash plate of the pump for rolling P slowly returned to the neutral position. In this case, a rapid braking force is not obtained due to the slow return of the swash plate S. As a result, the vehicle rolls a long distance until stopped, to have a risk of hitting the obstacle.

Figure 4:
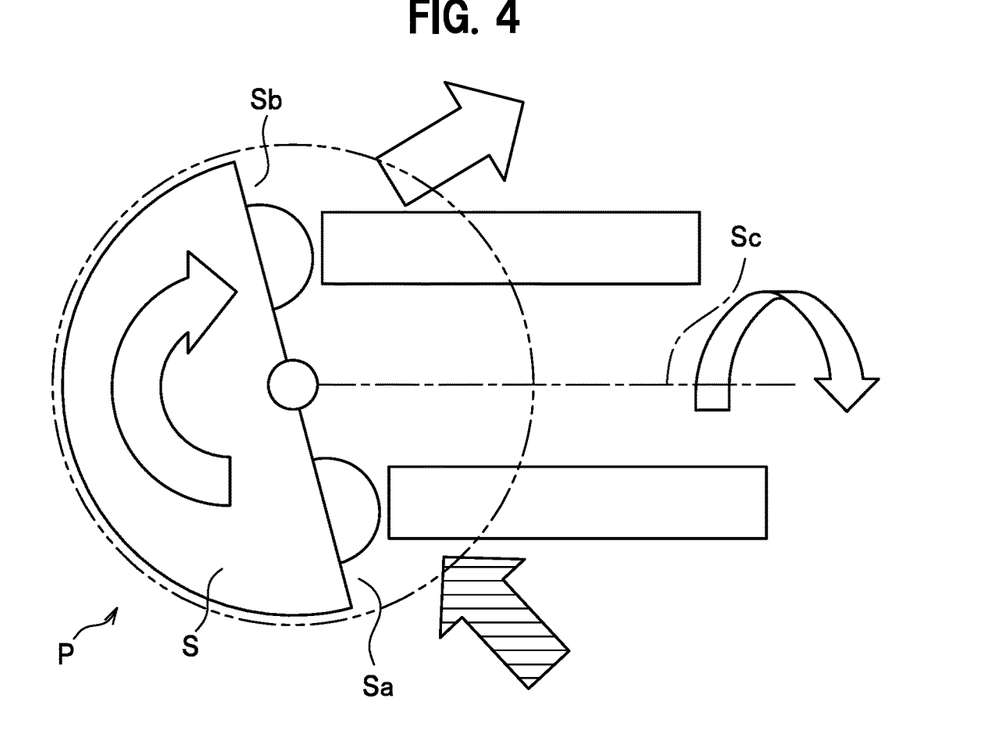
FIG. 4 is a schematic diagram of a pump for rolling according to the present embodiment.

In contrast, the brake mechanism 6 of the present embodiment generates a compressive returning force for compressing a low-pressure side of the swash plate S to push back the swash plate S to the neutral position, and a decompressive returning force for decompressing a high-pressure side of the swash plate S to push back the swash plate S to the neutral position, when an obstacle has been detected during reverse rolling, for example. In FIG. 4, the swash plate S is tilted, to have a lower side as the low-pressure side and an upper side as the high-pressure side with respect to a drive shaft Sc. Therefore, in the present embodiment, one side Sa of the swash plate S is compressed to generate the compressive returning force, and the other side Sb is decompressed to generate the decompressive returning force. Note that the high-pressure side or low-pressure side of the swash plate S is identified with a pressure gauge or a swash plate angle sensor provided in the pump for rolling P, or the like.

Specifically, the controller 3 outputs a compression signal to switch the compression-side switching valve V2 from the right position to the left position for communication. Accordingly, hydraulic oil replenished by the charge pump P1 is supplied to the one side Sa of the swash plate S via a pressure receiver Pa on one side of the pump for rolling P so that the low-pressure side is compressed. Thus, the swash plate S is assisted to return to the neutral position.

Further, the controller 3 outputs a decompression signal to switch the decompression-side switching valve V3 from the right position to the left position for communication. Accordingly, the hydraulic oil on the other side Sb of the swash plate S is returned to the hydraulic tank T via a pressure receiver Pb on the other side of the pump for rolling P and the return hydraulic passage T4. Accordingly, the swash plate S is assisted to return to the neutral position.

Timing since the controller 3 has determined presence of the obstacle G until the brake signal (compression signal and decompression signal) is outputted, that is, start timing for braking by the brake mechanism 6 is preferably changed in response to rolling speed of the vehicle. The controller 3 compares a braking start distance set in advance for the rolling speed to a distance measured by the distance image sensor 2 to the obstacle G present in the detection range 4, and outputs the compression signal to the compression-side switching valve V2 and the decompression signal to the decompression-side switching valve V3 when the distance to the obstacle G becomes equal to or less than the braking start distance.

The braking start distance is set to a distance slightly longer than an actually measured limit braking distance of the vehicle, for example. A proximity sensor such as a rotary encoder for detecting the number of rotations of the tire may be used as a vehicle speed sensor 7 (FIG. 2) for detecting rolling speed of the vehicle.

Figure 5:
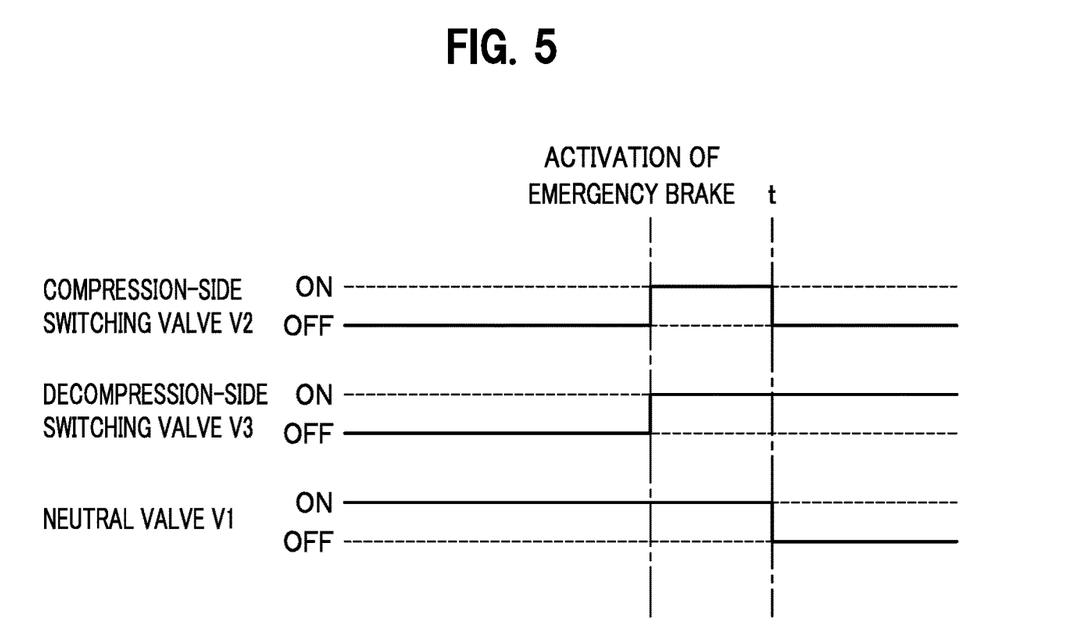
FIG. 5 shows an example of a timing chart of switching valves according to the present embodiment.

As illustrated in FIG. 5, when the vehicle is rolling at medium to high speed, for example, the controller 3 outputs a neutral signal after t seconds since the compression signal and the decompression signal have been outputted, to switch the neutral valve V1 from the left position to the right position for communication. Supposing that, when the vehicle is rolling at medium to high speed, the compression signal is outputted after the neutral signal has been outputted, the swash plate S may be tilted toward an opposite side due to the compressive returning force, causing the swash plate S to swing back. This causes vehicle behavior to be unstable. In this regard, in the present embodiment, the compression signal and the decompression signal are outputted to have the swash plate S returned to the neutral position (just before the swash plate S is returned), and then the neutral valve V1 is controlled to communicate so that there is no pressure difference. Thus, the inertial force is suppressed when the swash plate S is returned, to prevent the swash plate from swinging back.

Further, as illustrated in FIG. 5, when the vehicle is rolling at medium to high speed, the controller 3 switches the compression-side switching valve V2 to the right position for blocking, after t seconds since the compression signal and the decompression signal have been outputted, to complete compression. Meanwhile, the controller 3 controls the decompression-side switching valve V3 to keep communicating. Supposing that, when the vehicle is rolling at medium to high speed, both flow passages of the compression-side switching valve V2 and the decompression-side switching valve V3 are blocked after t seconds since the compression signal and the decompression signal have been outputted, pressure fluctuations become large, to have a risk that the swash plate S may swing. Therefore, while the compression-side switching valve V2 is blocked after t seconds since the compression signal and the decompression signal have been outputted, the decompression-side switching valve V3 is controlled to communicate to return the operating oil to the hydraulic tank T, to suppress pressure fluctuations. Thus, the swash plate S is prevented from swinging so that the swash plate S is stably returned.

Further, in the present embodiment, the bypass hydraulic passage T3 has the first orifice F1 and the return hydraulic passage T4 has the second orifice F2. The first orifice F1 and the second orifice F2 are formed to reduce a flow rate of the hydraulic oil, so as to finely adjust the compressive returning force and decompressive returning force. Note that the first orifice F1 and second orifice F2 may be omitted, or only one of them may be formed.

Figure 6:
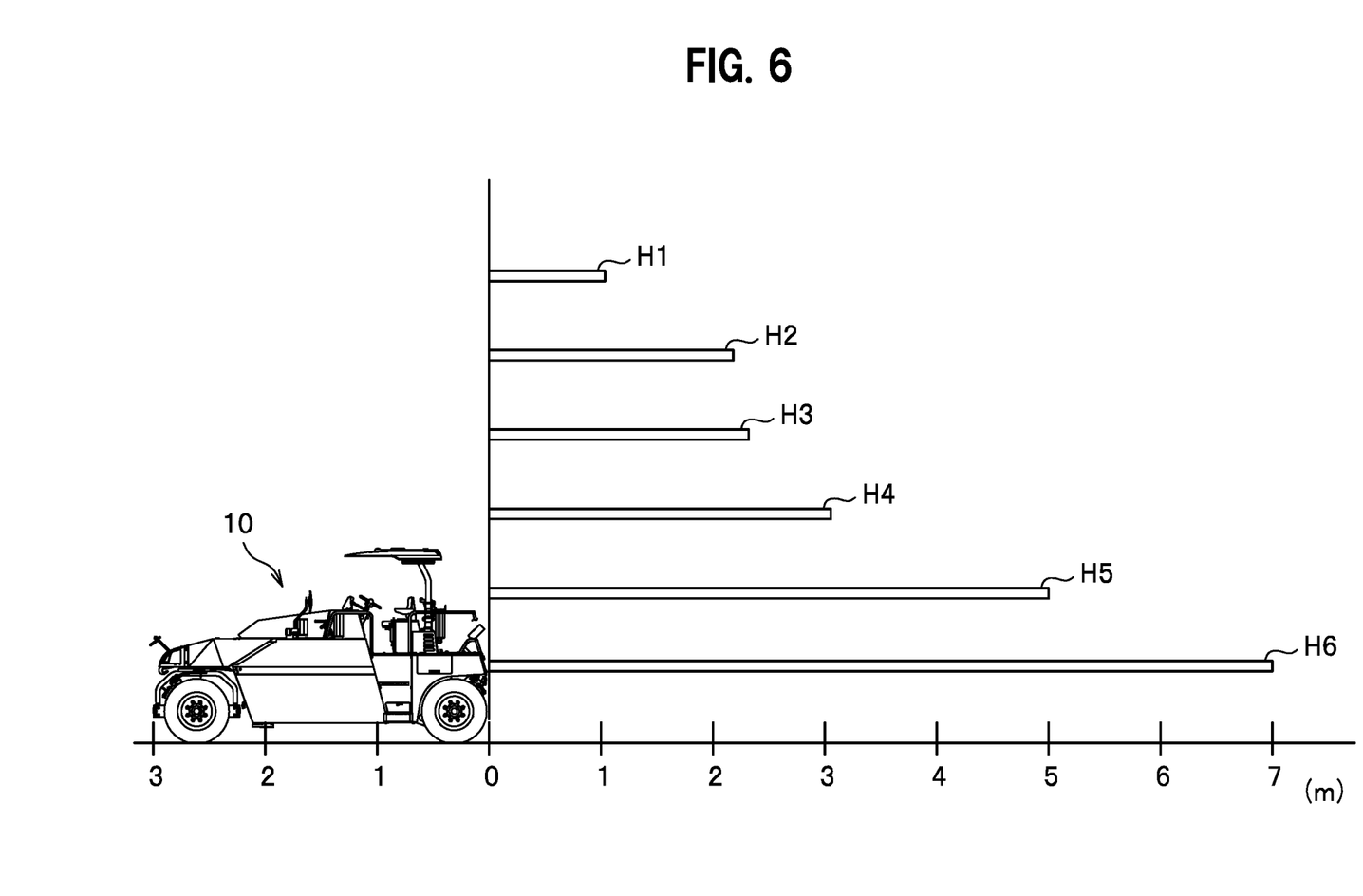
FIG. 6 is a chart showing results of examining a braking distance.

FIG. 6 is a chart showing results of examining braking distances. In this examination, the construction vehicle had been rolled rearward at 8.0 km/h and braking distances were measured since various braking means had been operated until the construction vehicle was stopped. A tandem roller SW504 of SAKAI HEAVY INDUSTRIES, LTD. was used as a construction vehicle.

As shown in FIG. 6, a result (of Case 1) H1 indicates the braking distance of the vehicle with the obstacle detector 1 according to the present embodiment. Note that, in the result H1, the first orifice F1 is not formed and only the second orifice F2 is formed in the embodiment described above.

A result (of Case 2) H2 indicates the braking distance when a foot brake was operated. A result (of Case 3) H3 indicates the braking distance when the forward/reverse lever was manually returned to the neutral position. A result (of Case 4) H4 indicates the braking distance when the engine was forcibly turned off during rolling. A result (of Case 5) H5 indicates the braking distance when a parking brake was operated.

Further, a result (of Comparative example 1) H6 indicates the braking distance when the neutral valve was switched by the brake signal to return the swash plate to the neutral position, to cause the high-pressure side of the pump for rolling P to have the same pressure as the low-pressure side to stop the construction vehicle, as with an emergency brake of a conventional obstacle detector.

The result H6 of Comparative example 1 indicates that the braking distance was about 7.0 m, whereas the result H1 of Case 1 indicates that the braking distance was about 1.2 m. Further, the braking distance in Case 1 is shorter than the results H2 to H5, with use of other braking means of the tandem rollers SW504.

According to the obstacle detector 1 of the present embodiment described above, the low-pressure side of the swash plate S of the pump for rolling P is compressed to generate the compressive returning force to assist the returning force of the swash plate S. Further, the high-pressure side of the pump for rolling P is decompressed to generate the decompressive returning force to assist the returning force of the swash plate S. Still further, the advantageous effects of the present disclosure are obtained as long as either one of the compressive returning force and decompressive returning force is provided. However, when both of the compressive returning force and decompressive returning force are generated, the swash plate S is returned more quickly and stably, as in the present embodiment.

Further, as in the present embodiment, the neutral valve V1 is preferably controlled to communicate after at least one of the compressive returning force and decompressive returning force is generated (after t seconds, for example), to flow the hydraulic oil into the second hydraulic closed circuit U2. With the structure, the swash plate S is prevented from tilting toward an opposite side to swing back. This prevents the swash plate S from swinging back when the vehicle stops to cause damage to a pavement.

Further, the compression-side switching valve V2 is switched to supply the hydraulic oil to the low-pressure side of the swash plate S so as to generate the compressive returning force, and the decompression-side switching valve V3 is switched to return the hydraulic oil on the high-pressure side of the swash plate S into the hydraulic oil tank T so as to generate the decompressive returning force. Thus, the brake mechanism 6 is easily formed.

In other words, the compressive returning force is given by simply providing the bypass hydraulic passage T3 and the compression-side switching valve V2 in an existing hydraulic circuit. Further, the decompressive returning force is given by simply providing the return hydraulic passage T4 and the decompression-side switching valve V3 in the existing hydraulic circuit. Thus, the existing hydraulic circuit is used to add simple mechanisms, to obtain advantageous effects described above, and the obstacle detector disclosed in the present disclosure can additionally be mounted on an existing construction vehicle.

When a brake signal is outputted, the forward/reverse lever may be physically returned to the neutral position to stop the vehicle, for example. However, with this method, the forward/reverse lever is suddenly returned to the neutral position against operation by a driver, so that the forward/reverse lever may come into contact with a hand of the driver to hurt the driver. Further, the operation is not intended by the driver, to increase a burden on the driver.

Meanwhile, in the method to stop the vehicle by physically returning the forward/reverse lever to the neutral position when a brake signal is outputted, for example, the forward/reverse lever may fail to return to the neutral position in the first place because the forward/reverse lever has been broken or a foreign object has been caught in the forward/reverse lever so that the vehicle cannot be stopped.

In this regard, according to the present embodiment, the brake mechanism 6 is provided to stop the vehicle without physically returning the forward/reverse lever to the neutral position, to have no risk of hurting the driver by the forward/reverse lever. Further, according to the present embodiment, swinging back and fluctuations of the swash plate S are suppressed to stably brake the construction vehicle, to decrease a burden on the driver.

<Modifications>

Figure 7:
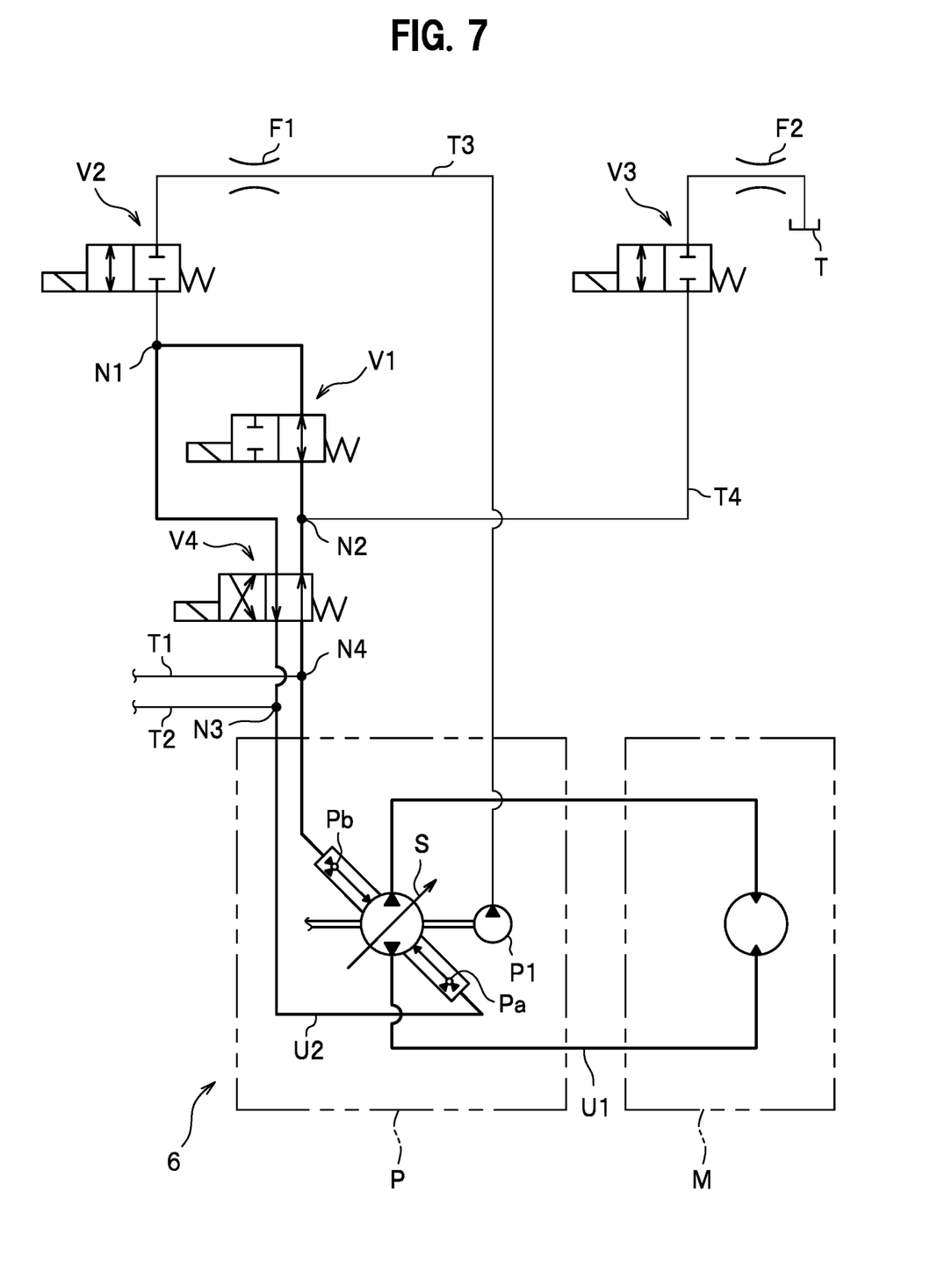
FIG. 7 is a schematic diagram of a hydraulic circuit according to a modification of the present embodiment.

The embodiment of the present disclosure has been described above but may be modified in design appropriately without departing from the scope of the present disclosure. FIG. 7 is a schematic diagram of a hydraulic circuit according to a modification of the present disclosure. In the embodiment described above, the case has been described where the emergency brake is activated only when the vehicle rolls rearward, but the emergency brake may be activated both when the vehicle rolls rearward and when the vehicle rolls forward.

In the modification, as illustrated in FIG. 7, a forward/reverse switching valve (solenoid valve) V4 is provided in the second hydraulic closed circuit U2. The forward/reverse switching valve V4 is configured to switch a flow direction of the hydraulic oil in the second hydraulic closed circuit U2. The controller 3 switches the forward/reverse switching valve V4 to the right position or the left position in response to switching of the rolling direction of the vehicle. In a case where the emergency brake is activated both when the vehicle rolls rearward and when the vehicle rolls forward, the forward/reverse switching valve 4 accordingly switches the flow direction of the hydraulic oil in the second hydraulic closed circuit U2. Thus, the compressive returning force and decompressive returning force are appropriately generated.

Figure 8A:
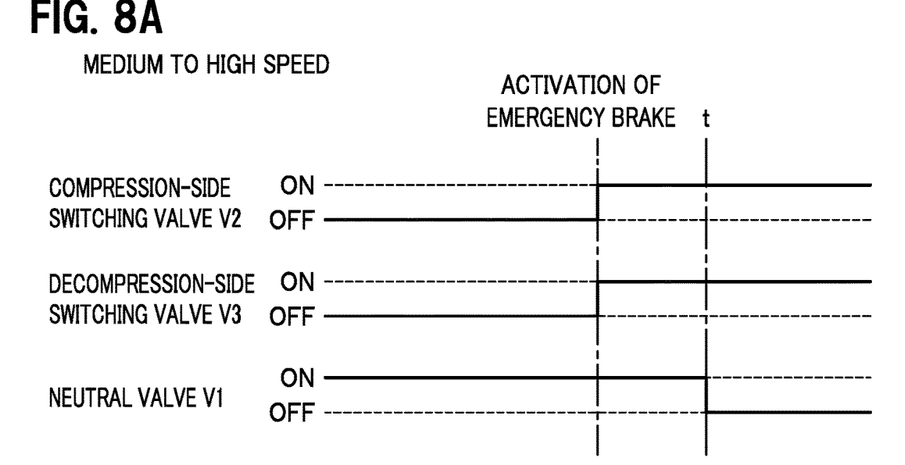
FIG. 8A is a modified switching timing chart of the switching valves when the construction vehicle rolls at medium to high speed.
Figure 8B:
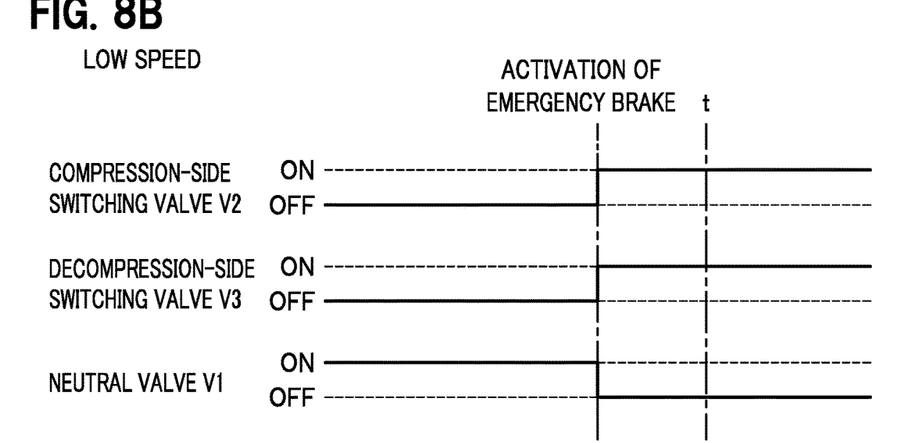
Figure 8C:
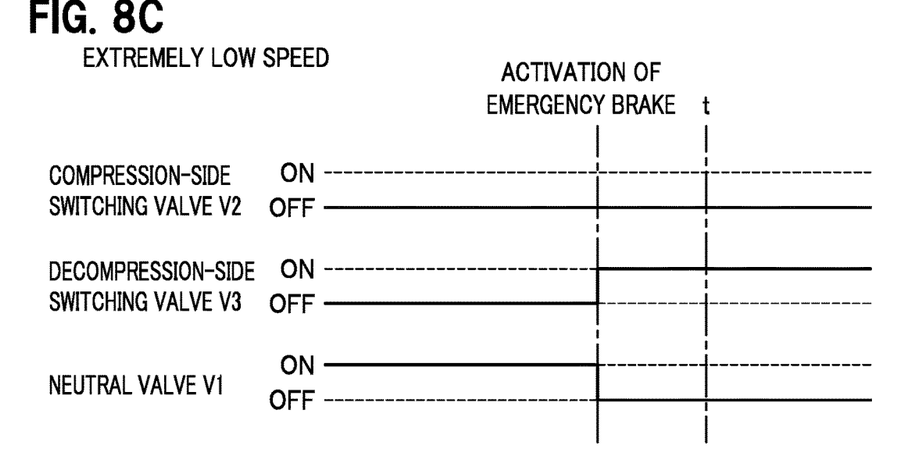

FIGS. 8A to 8C are modified switching timing charts of the switching valves. FIG. 8A is a timing chart when the vehicle rolls at medium to high speed, FIG. 8B is the same when the vehicle rolls at low speed, and FIG. 8C is the same when the vehicle rolls at extremely low speed. As in the modifications, the switching timing of the switching valves may be changed in response to vehicle speed.

The medium to high speed of the vehicle is a case where the amount of oil in the first hydraulic closed circuit U1 is equal to or more than 40%, for example. The low speed of the vehicle is a case where the amount of oil in the first hydraulic closed circuit U1 is equal to or more than 30% and less than 40%, for example. The extremely low speed of the vehicle is a case where the amount of oil in the first hydraulic closed circuit U1 is less than 30%, for example. Note that the threshold value of each speed is merely an example. Further, the switching timing of each switching valve may be changed by a factor other than the amount of oil.

As illustrated in FIG. 8A, when the vehicle rolls at medium to high speed and the emergency brake is activated to cause both the compression-side switching valve V2 and the decompression-side switching valve V3 to communicate to generate the compressive returning force and decompressive returning force, both the compression-side switching valve V2 and decompression-side switching valve V3 may be set to keep communicating while the neutral valve V1 is controlled to communicate after t seconds. That is, in the embodiment, the compression-side switching valve V2 is closed after t seconds, but the compression-side switching valve V2 may keep communicating as in this modification.

When the vehicle rolls at medium to high speed, if the compression-side switching valve V2 is blocked after t seconds, the swash plate S may swing back. However, according to the modification, the hydraulic oil is gradually returned through the second orifice F2 to the hydraulic oil tank T while the compressive returning force is maintained, to prevent the swash plate S from swinging back.

As illustrated in FIG. 8B, when the vehicle rolls at low speed and the emergency brake is activated to cause both the compression-side switching valve V2 and decompression-side switching valve V3 to communicate to generate the compressive returning force and decompressive returning force and to cause the neutral valve V1 to communicate, the neutral valve V1, the compression-side switching valve V2, and decompression-side switching valve V3 may be set to keep communicating even after t seconds. According to this modification, since the vehicle rolls at low speed, the swash plate S does not likely to swing back even if the compressive returning force and decompressive returning force are generated and the neutral valve V1 is controlled to communicate. Then, the neutral valve V1 is switched together with the compression-side switching valve V2 and decompression-side switching valve V3 so as to communicate, to prevent the swash plate S from swinging back and quickly return the swash plate S to the neutral position.

As illustrated in FIG. 8C, when the vehicle rolls at extremely low speed and the emergency brake is activated to cause the decompression-side switching valve V3 to communicate to generate the decompressive returning force and to cause the neutral valve V1 to communicate, both the neutral valve V1 and the decompression-side switching valve V3 may be set to keep communicating even after t seconds. At this time, the compression-side switching valve V2 is kept blocked. According to this modification, since the vehicle rolls at extremely low speed and the amount of hydraulic oil flowing in the first hydraulic closed circuit U1 is little, the swash plate S is returned to the neutral position without swinging back, only by generating the decompressive returning force.

Note that, when the vehicle rolls at extremely low speed and the emergency brake is activated to cause the compression-side switching valve V2 to communicate to generate the compressive returning force and to cause the neutral valve V1 to communicate, both the neutral valve V1 and the compression-side switching valve V2 may be set to keep communicating even after t seconds. At this time, the decompression-side switching valve V3 is kept blocked.

As described above, the switching timing of the neutral valve V1, the compression-side switching valve V2, and the decompression-side switching valve V3 may be appropriately set. The timing may be appropriately set in consideration of balance between the inertia of rolling of the vehicle (flow of the hydraulic oil in the first hydraulic closed circuit U1), that is, the force with which the swash plate S keeps tilting and the force which works to return the swash plate S to the neutral position by compression and/or decompression. According to these modifications, the switching timing of each switching valve is changed in response to vehicle speed so that the swash plate S is returned faster to the neutral position and swinging back just before the vehicle stops is made smaller.

Further, in the embodiment described above, as shown in FIGS. 5, 8A, 8B, and 8C, the timing for switching the compression-side switching valve V2 and decompression-side switching valve V3 after the emergency brake has been activated is set using "time", but is not limited thereto.

The returning force of the swash plate S varies based on specifications of the pump for rolling, the motor for rolling, and the hydraulic circuit, and also varies based on the flow rate of the hydraulic oil by the number of rotations of the engine, the tilted angle of the swash plate S, the load on the swash plate S, and the like. Therefore, the switching timing of each switching valve may be appropriately set based on at least one of the time since the emergency brake has been activated, the vehicle speed of the construction vehicle, the swash plate angle of the swash plate S, the number of rotations of the engine, and the position of the forward/reverse lever.

At the setting, the switching timing of each switching valve may be set based on measurement data obtained from the vehicle speed sensor 7 (see FIG. 2), the swash plate angle sensor, an engine speed sensor, and a position sensor of the forward/reverse lever, for example. The timing may be stored in the storage 32 of the controller 3 as a data file. Accordingly, the vehicle is braked more accurately and stably in response to a situation of the vehicle.

Further, when the emergency brake is activated, an alarm, which generates sound, light, or the like, may be linked for alarming. Further, the TOF (Time Of Flight) type distance image sensor (3D distance sensor) 2 has been described, which measures a distance to an object by using projected light and reflected light, as an object detection sensor, but the present disclosure is not limited thereto. A sensor such as an ultrasonic type sensor, a microwave type sensor, a laser light type sensor, an infrared type sensor, a radar type sensor, a lidar type sensor, a stereo camera type sensor, and a monocular camera type sensor, which detects an object within a predetermined range, may be used as an object detection sensor. Further, the compressive returning force and decompressive returning force may be generated by another method different from the method described above.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. An obstacle detector of a construction vehicle comprising:
   a controller including a determinator for determining presence or absence of an obstacle based on data from a sensor; and
   a brake mechanism for causing the construction vehicle to activate an emergency brake after the determinator has detected the obstacle,
   wherein the brake mechanism includes:
      a first hydraulic closed circuit in which a pump for rolling, which is equipped with a swash plate and is driven by an engine, is connected in series to a motor for rolling, which causes the construction vehicle to roll;
      a second hydraulic closed circuit including a first hydraulic passage communicating with one side of the pump for rolling and a second hydraulic passage communicating with another side of the pump for rolling, to actuate the swash plate; and
      a neutral valve provided in the second closed circuit and communicating the one side of the pump with the another side of the pump for rolling,
   wherein, when the emergency brake is activated, at least one of a compressive returning force is generated compressing a low-pressure side of the swash plate from a tilt position to a neutral position and a decompressive returning force is generated decompressing a high-pressure side of the swash plate so as to return the swash plate to the neutral position,
   wherein a compression-side switching valve is switched to supply hydraulic oil to the low-pressure side of the swash plate so as to generate the compressive returning force,
   wherein a decompression-side switching valve is switched to return the hydraulic oil in the high-pressure side of the swash plate to a hydraulic tank so as to generate the decompressive returning force, and
   wherein the controller individually controls switching timings of the neutral valve, the compression-side switching valve, and the decompression-side switching valve.

2. The obstacle detector of a construction vehicle as claimed in claim 1, wherein the neutral valve is controlled to communicate after at least one of the compressive returning force and decompressive returning force has been generated.

3. The obstacle detector of a construction vehicle as claimed in claim 2,
   wherein the compression-side switching valve is switched to supply hydraulic oil to the low-pressure side of the swash plate so as to generate the compressive returning force, and
   wherein the decompression-side switching valve is switched to return the hydraulic oil in the high-pressure side of the swash plate to a hydraulic tank so as to generate the decompressive returning force.

4. The obstacle detector of a construction vehicle as claimed in claim 1, wherein the neutral valve is controlled to communicate at the same time as at least one of the compressive returning force and decompressive returning force is generated.

5. The obstacle detector of a construction vehicle as claimed in claim 3,
   wherein the compression-side switching valve is switched to supply hydraulic oil to the low-pressure side of the swash plate so as to generate the compressive returning force, and
   wherein the decompression-side switching valve is switched to return the hydraulic oil in the high-pressure side of the swash plate to a hydraulic tank so as to generate the decompressive returning force.

6. The obstacle detector of a construction vehicle as claimed in claim 1, wherein switching timing of the neutral valve, the compression-side switching valve, and the decompression-side switching valve is set based on at least one of time for generating the compressive returning force, time for generating the decompressive returning force, vehicle speed of the construction vehicle, a swash plate angle of the swash plate, the number of rotations of the engine, and a position of a forward/reverse lever.

* * * * *